US011533660B2

(12) United States Patent
Kim et al.

(10) Patent No.: US 11,533,660 B2
(45) Date of Patent: Dec. 20, 2022

(54) DEVICE AND METHOD FOR PROCESSING PLURALITY OF RESOURCE REQUESTS IN WIRELESS COMMUNICATION SYSTEM

(71) Applicant: Samsung Electronics Co., Ltd., Gyeonggi-do (KR)

(72) Inventors: Soenghun Kim, Gyeonggi-do (KR); Jaehyuk Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 59 days.

(21) Appl. No.: 16/989,370

(22) Filed: Aug. 10, 2020

(65) Prior Publication Data

US 2021/0029591 A1  Jan. 28, 2021

Related U.S. Application Data

(63) Continuation of application No. 15/752,531, filed as application No. PCT/KR2016/008910 on Aug. 12, 2016, now Pat. No. 10,743,216.

(30) Foreign Application Priority Data

Aug. 13, 2015 (KR) .......................... 10-2015-0114916

(51) Int. Cl.
*H04W 28/26* (2009.01)
*H04L 5/00* (2006.01)
(Continued)

(52) U.S. Cl.
CPC .......... *H04W 28/26* (2013.01); *H04B 7/0626* (2013.01); *H04L 1/1812* (2013.01);
(Continued)

(58) Field of Classification Search
CPC ..... H04W 28/26; H04W 16/10; H04W 16/32; H04W 56/00; H04W 72/0413;
(Continued)

(56) References Cited

U.S. PATENT DOCUMENTS

2004/0185875 A1  9/2004 Diacakis et al.
2007/0168228 A1  7/2007 Lawless
(Continued)

FOREIGN PATENT DOCUMENTS

KR  1020130087548  8/2013

OTHER PUBLICATIONS

PCT/ISA/210 Search Report dated Jan. 5, 2017 issued on PCT/KR2016/008910 (pp. 8).
(Continued)

*Primary Examiner* — Hardikkumar D Patel
(74) *Attorney, Agent, or Firm* — The Farrell Law Firm, P.C.

(57) ABSTRACT

Disclosed are a communication method for merging an IoT technique with a 5G communication system for supporting a data transmission rate higher than that of a 4G system; and a system therefor. The present disclosure can be applied to intelligent services on the basis of a 5G communication technique and IoT-related techniques. The disclosed method relates to processing a resource allocation request of a terminal in a communication system, the method comprising the steps of: triggering a resource allocation request; confirming whether a resource for transmitting the resource allocation request has been allocated to a first subframe of at least two serving cells at the same time; and transmitting the resource allocation request to one serving cell of the at least two serving cells according to a predetermined condition when the resource is allocated to the first subframe of the at least two serving cells at the same time.

16 Claims, 15 Drawing Sheets

(51) Int. Cl.
   *H04W 56/00* (2009.01)
   *H04W 76/28* (2018.01)
   *H04B 7/06* (2006.01)
   *H04L 1/18* (2006.01)
   *H04W 16/10* (2009.01)
   *H04W 16/32* (2009.01)
   *H04W 72/04* (2009.01)

(52) U.S. Cl.
   CPC ............ *H04L 5/001* (2013.01); *H04L 5/0053* (2013.01); *H04L 5/0057* (2013.01); *H04W 16/10* (2013.01); *H04W 16/32* (2013.01); *H04W 56/00* (2013.01); *H04W 72/0413* (2013.01); *H04W 76/28* (2018.02)

(58) Field of Classification Search
   CPC .... H04W 76/28; H04B 7/0626; H04L 1/1812; H04L 5/001; H04L 5/0053; H04L 5/0057
   See application file for complete search history.

(56) References Cited

U.S. PATENT DOCUMENTS

| | | | |
|---|---|---|---|
| 2009/0201868 A1 | 8/2009 | Chun et al. | |
| 2010/0111023 A1 | 5/2010 | Pelletier et al. | |
| 2011/0243047 A1* | 10/2011 | Dayal ................... | H04W 16/14 370/329 |
| 2012/0069805 A1 | 3/2012 | Feuersanger et al. | |
| 2012/0134305 A1* | 5/2012 | Damnjanovic ....... | H04L 1/1854 370/280 |
| 2013/0260820 A1* | 10/2013 | Schmandt ........... | H04W 56/001 455/553.1 |
| 2013/0301542 A1 | 11/2013 | Krishnamurthy et al. | |
| 2014/0133447 A1 | 5/2014 | Moulsley et al. | |
| 2014/0341192 A1* | 11/2014 | Venkob ............ | H04W 52/0216 370/336 |
| 2015/0009972 A1 | 1/2015 | Xu | |
| 2016/0262182 A1* | 9/2016 | Yang ................... | H04L 1/1854 |
| 2017/0048108 A1* | 2/2017 | Yi ...................... | H04L 41/0816 |
| 2017/0332350 A1* | 11/2017 | Paredes Cabrera ......................... H04W 72/005 |

OTHER PUBLICATIONS

PCT/ISA/237 Written Opinion dated Jan. 5, 2017 issued on PCT/KR2016/008910 (pp. 6).
3GPP TSG RAN WG1 Meeting #81, Fukuoka, Japan, May 25-29, 2015, Remaining issues for PUCCH on Scell, pp. 7.

* cited by examiner

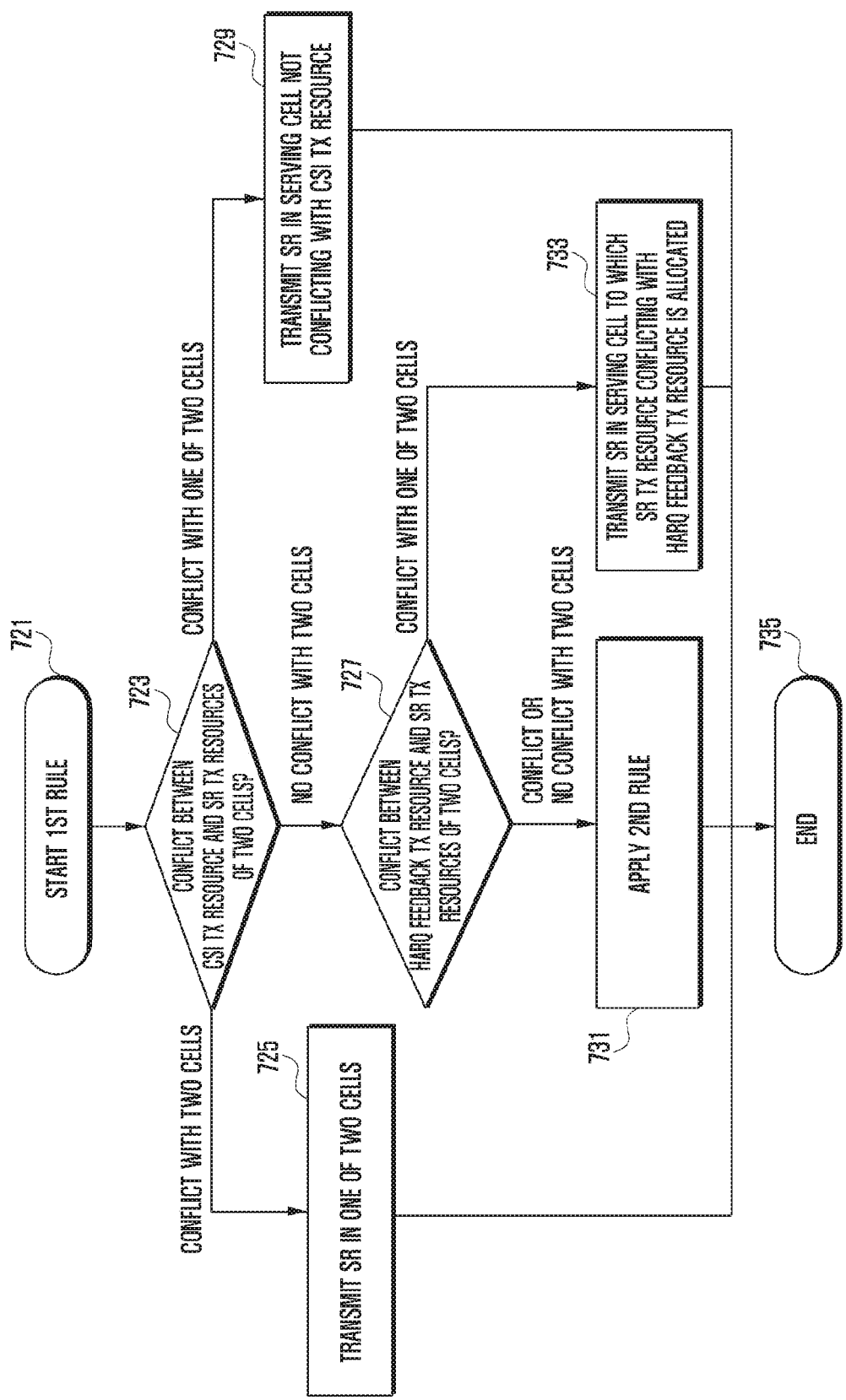

DEVICE AND METHOD FOR PROCESSING PLURALITY OF RESOURCE REQUESTS IN WIRELESS COMMUNICATION SYSTEM

PRIORITY

This application is a Continuation Application of U.S. patent application Ser. No. 15/752,531, which was filed with the U.S. Patent and Trademark Office on Feb. 13, 2018 as a National Phase Entry of PCT International Application No. PCT/KR2016/008910, which was filed on Aug. 12, 2016, and claims priority to Korean Patent Application No. 10-2015-0114916, which was filed on Aug. 13, 2015, the content of each of which is incorporated herein by reference.

BACKGROUND

1. Field

The present invention relates to a wireless communication system and, more particularly, to a method for a terminal to transmit a resource request in a long term evolution (LTE) system when a base station configures the terminal to transmit the resource request in a plurality of carriers.

2. Description of the Related Art

In order to satisfy increasing demands of radio data traffic after the commercialization of a 4G communication system, efforts at developing an advanced 5G communication system or a pre-5G communication system have been made. For this reason, the 5G communication system or the pre-5G communication system is also referred to as a beyond-4G network communication system or a post-LTE system. In order to accomplish a higher data transfer rate, the 5G communication system considers implementation at a super-high frequency (mmWave) band (e.g., such as a 60 GHz band). In order to obviate a path loss of a radio wave and increase a delivery distance of a radio wave at the super-high frequency band, various techniques such as a beamforming, a massive MIMO, a full dimensional MIMO (FD-MIMO), an array antenna, an analog beam-forming, and a large scale antenna are discussed in the 5G communication system. Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like. Besides, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Meanwhile, the Internet is evolving from a human-centric network, in which humans generate and consume information, into an Internet of things (IoT) network in which distributed things exchange and process information. Further, the IoT technology combines with big data processing technology through connection with a cloud server or the like, thus developing into Internet of everything (IoE) technology. In order to realize the IoT, relevant technologies such as sensing technology, wired/wireless communication, network infrastructure, service interface technology, and security technology are required. Thus, recently, technologies such as a sensor network, machine-to-machine (M2M), and machine type communication (MTC) are studied. In the IoT environment, an intelligent Internet technology (IT) service can be provided that collects and analyzes data generated from connected things and thereby creates new value in a human life. The IoT can be applied to fields of smart home, smart building, smart city, smart car or connected car, smart grid, health care, smart home appliance, and advanced medical service through the fusion of existing information technology (IT) and various industries.

Accordingly, various attempts are now made to apply the 5G communication system to the IoT network. For example, technologies such as a sensor network, machine-to-machine (M2M), and machine type communication (MTC) are implemented by techniques such as beamforming, MIMO, and array antennas which belong to the 5G communication technology. To apply a cloud radio access network (cloud RAN) for the above-mentioned big data processing technology is an example of the fusion of the 5G technology and the IoT technology.

Meanwhile, wireless communication technologies have developed rapidly, and communication system technologies have evolved accordingly. Among them, the LTE system is now popularized as the fourth generation mobile communication technology. In LTE system, various techniques have been introduced to meet increasing traffic demands, and one of such techniques is carrier aggregation (hereinafter, referred to as CA). Compared to a typical technique that uses only one carrier for communication between a terminal (also referred to as user equipment (UE)) and a base station (also referred to as E-UTRAN NodeB (eNB)), the CA technique uses one main carrier and one or more subcarriers. The LTE system can dramatically increase the amount of transmission by the number of subcarriers added using the CA technique. Meanwhile, in the LTE system, the main carrier is referred to as a primary cell (PCell), and the subcarrier is referred to as a secondary cell (SCell). While only one PCell exists, SCells can exist up to four in the LTE Release 10. In Release 13, the standardization aims to extend up to thirty one.

On the one hand, when up to five carriers including the PCell are used as in Release 10, a control channel (physical uplink control channel, hereinafter referred to as PUCCH) transmitted from the terminal to the base station is transmitted only in the PCell. Information transmitted through the PUCCH includes information indicating whether downlink data transmitted by the base station is successfully received (i.e., hybrid automatic repeat request (HARQ) ACK/NAK information about whether downlink data is received, hereinafter referred to as HARQ feedback), information indicating downlink signal state information (channel state information, hereinafter referred to as CSI), information for a resource request of the terminal having data to transmit through uplink (a scheduling request, hereinafter referred to as a scheduling request, a resource allocation request, or an SR), and the like.

On the other hand, when the carriers are extended up to thirty two carriers as in Release 13, it is necessary to distribute the PUCCH because the amount of information is too much to transmit the PUCCH only through the PCell. Thus, on the SCell as well, the transmission of the PUCCH may be permitted. Accordingly, resources for the PUCCH transmission may be often allocated simultaneously to a plurality of carriers, and a method for processing this case is needed.

Additionally, in order to reduce power consumption, the terminal can use a discontinuous reception (hereinafter referred to as DRX) function instead of continuously receiving a signal from the base station. In the DRX defined in Release 8 of LTE, the terminal may perform a DRX operation with a cycle of 10 ms to 2560 ms. Also, in Release 13, in order to further reduce power consumption, it is considered to increase the DRX cycle up to 10.24 seconds. However, typical signaling transmitted to the terminal for setting the DRX function cannot omit (i.e., mandatory present) cycle information of 10 ms to 2560 ms. Accordingly, when the cycle up to 10.24 seconds is used, a method for indicating both new cycle information and typical cycle information is needed.

SUMMARY

The present invention has been made to solve the above problems, and it is an object of the present invention to provide an apparatus and method for selecting a carrier for SR transmission when resources for SR transmission are allocated to subframes having the same time point in a plurality of carriers in a wireless mobile communication system.

According to the present invention for solving the above problems, provided is a method for processing a resource allocation request at a terminal in a communication system, that includes triggering a resource allocation request; identifying whether resources for transmitting the resource allocation request are allocated to first subframes having a same time point in at least two serving cells; and transmitting the resource allocation request in one of the at least two serving cells, based on whether the first subframe is the same as a second subframe for transmitting channel state information (CSI) of the at least one of the at least two serving cells, in case that the resources are allocated to the first subframes having the same time point in the at least two serving cells.

In addition, according to the present invention for solving the above problems, a terminal for processing a resource allocation request in a communication system comprises a communication unit configured to transmit and receive a signal to and from other network entity, and a controller configured to trigger a resource allocation request, to identify whether resources to transmit the resource allocation request are allocated to first subframes having a same time point in at least two serving cells, and to control the communication unit to transmit the resource allocation request in one of the at least two serving cells according to a predetermined condition when the resources are allocated to the first subframes having the same time point in the at least two serving cells.

In addition, according to the present invention for solving the above problems, a base station for transmitting configuration information of a terminal in a communication system comprises a communication unit configured to transmit and receive a signal to and from other network entity, and a controller configured to identify whether a cycle value to be set for a discontinuous reception operation of the terminal exceeds a first predetermined cycle value, to set first cycle information to a second predetermined cycle value when the first predetermined cycle value is exceeded, to set second cycle information to the cycle value to be set, and to control the communication unit to transmit the configuration information including the first cycle information and the second cycle information to the terminal.

Specifically, when resource for SR transmission (hereinafter, SR transmission resources) are allocated to subframes having the same time point in at least two cells, the terminal determines in the zero-th rule whether there is a conflict with a measurement gap (MG). If all the SR transmission resources allocated to two cells conflict with the MG, the terminal defers the SR transmission. If all the SR transmission resources of two cells do not conflict with the MG, the terminal applies the first rule. If the SR transmission resource of only one of two cells conflicts with the MG, the terminal transmits the SR by using the SR transmission resource of a serving cell that does not conflict with the MG.

In the first rule, the terminal determines whether there is a conflict with a PUCCH. If both the SR transmission resource of the first cell and the SR transmission resource of the second cell do not conflict with the PUCCH (HARQ feedback/CSI), the terminal applies the second rule. If the SR transmission resource of only one of two cells conflicts, the terminal transmits the SR by selecting the non-conflicting cell. If the SR transmission resource of the first cell conflicts with a resource allocated for transmission of HARQ feedback (hereinafter, an HARQ feedback transmission resource), and if the SR transmission resource of the second cell conflicts with a resource allocated for transmission of CSI (hereinafter, a CSI transmission resource), the terminal transmits the SR through the SR transmission resource of the first cell. This is because when the CSI transmission resource and the SR transmission resource conflict with each other, the terminal drops the CSI transmission, and when the HARQ feedback transmission resource and the SR transmission resource conflict with each other, the terminal transmits both together. If both the SR transmission resource of the first cell and the SR transmission resource of the second cell conflict with the HARQ feedback transmission resource, the terminal applies the third rule. If both the SR transmission resource of the first cell and the SR transmission resource of the second cell conflict with the CSI transmission resource, the terminal defers the SR transmission.

In the second rule, the terminal determines whether the SR transmission resource conflicts with a resource allocated for transmission of an SRS (hereinafter, an SRS transmission resource). If both the SR transmission resource of the first cell and the SR transmission resource of the second cell do not conflict with the SRS transmission resource, the terminal applies the third rule. If the SR transmission resource of one of the first and second cells conflicts with the SRS transmission resource, the terminal transmits the SR in the non-conflicting cell. This is because when the SRS transmission resource conflicts with the SR transmission resource, there is a possibility that the SRS transmission will be dropped. If both the SR transmission resource of the first cell and the SR transmission resource of the second cell conflict with the SRS transmission resource, the terminal applies the third rule.

In the third rule, the terminal determines whether there is a conflict with a transmission resource allocated for retransmission of a physical uplink shared channel (PUSCH) (hereinafter, a PUSCH retransmission resource). If the PUSCH retransmission is scheduled or not in both the SR transmission resource of the first cell and the SR transmission resource of the second cell, the terminal applies the fourth rule. If the SR transmission resource of the first cell conflicts with the PUSCH retransmission resource, and if the SR transmission resource of the second cell does not conflict with the PUSCH retransmission resource, the terminal transmits the SR in a serving cell that does not conflict with the PUSCH retransmission resource (or transmit the SR in a serving cell that conflicts with the PUSCH retransmission so as to reduce transmission power).

The fourth rule is as follows. That is, the SR is transmitted in a cell having a small signal attenuation (pathloss), in a cell having low required transmission power, in a serving cell that has most recently transmitted the SR, or in a predetermined serving cell (e.g., the Pcell).

When resources for SR transmission are allocated to a plurality of carriers in a wireless mobile communication system, it is possible to select a carrier for SR transmission according to an available uplink transmission resource of the terminal.

BRIEF DESCRIPTION OF DRAWINGS

The above and other aspects, features, and advantages of certain embodiments of the present disclosure will be more apparent from the following description taken in conjunction with accompanying drawings, in which:

FIGS. 7A to 7E are diagrams illustrating a method for selecting a cell for transmitting an SR proposed by the present invention.

DETAILED DESCRIPTION

Figure 1:
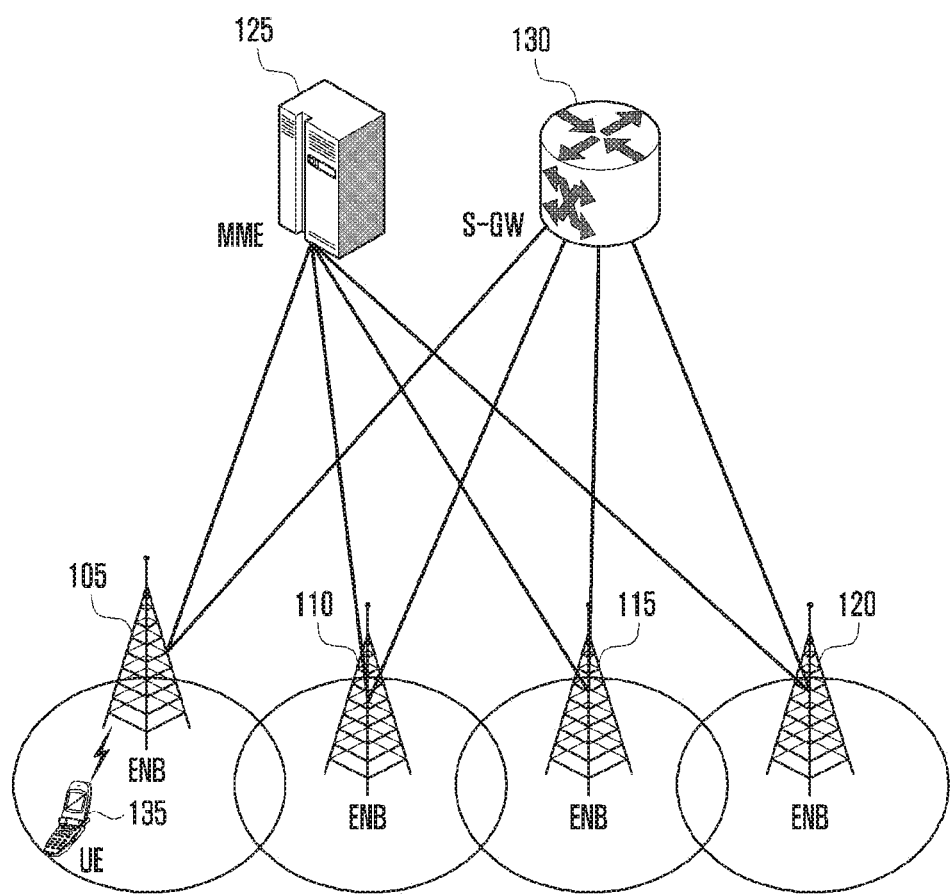
FIG. 1 is a diagram illustrating a structure of the LTE system to which the present invention is applied.

Embodiments of the present disclosure are described with reference to the accompanying drawings. Descriptions of well-known components and processing techniques are omitted so as to not unnecessarily obscure the present disclosure. The examples used herein are intended merely to facilitate an understanding of ways in which the present disclosure may be practiced and to further enable those of skill in the art to practice the present disclosure. Accordingly, the examples are not intended to be construed as limiting the scope of the present disclosure.

In the following description of embodiments, descriptions of techniques that are well known in the art and not directly related to the present invention are omitted. This is to clearly convey the subject matter of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

The present invention relates to a method and apparatus for performing a scheduling request (SR) in a plurality of cells having a PUCCH in an LTE mobile communication system.

FIG. 1 is a diagram illustrating a structure of the LTE system to which the present invention is applied.

Referring to FIG. 1, as shown, a radio access network 100 of the LTE system is composed of base stations (evolved Node B, hereinafter referred to as eNB, Node B, or base station) 105, 110, 115, and 120, a mobility management entity (MME) 125, and a serving gateway (S-GW) 130. A terminal (user equipment, hereinafter referred to as UE or terminal) 135 accesses an external network through the eNB 105-120 and the S-GW 130.

In FIG. 1, the eNB 105-120 corresponds to a typical node B in a universal mobile telecommunications system (UMTS) system. The eNB is connected to the UE 135 through a radio channel and performs more complicated functions than the typical node B. In the LTE system, all user traffics including a real-time service such as voice over IP (VoIP) are offered through a shared channel. Therefore, an apparatus that performs scheduling by collecting state information such as a UE buffer state, an available transmission power state, and a channel state is required. The eNB 105-120 performs this function. Normally, one eNB controls a plurality of cells.

In order to realize a transmission speed of, e.g., 100 Mbps, the LTE system uses orthogonal frequency division multiplexing (OFDM) as radio access technique at a bandwidth of, e.g., 20 MHz. In addition, the LTE system uses an adaptive modulation and coding (AMC) scheme that determines a modulation scheme and a channel coding rate, depending on a channel state of the UE.

The S-GW 130 is an apparatus for providing a data bearer and creates or removes the data bearer under the control of the MME 125.

The MME 125 is an apparatus for performing a variety of control functions as well as a mobility management function for the UE and is connected with a plurality of eNBs.

Figure 2:
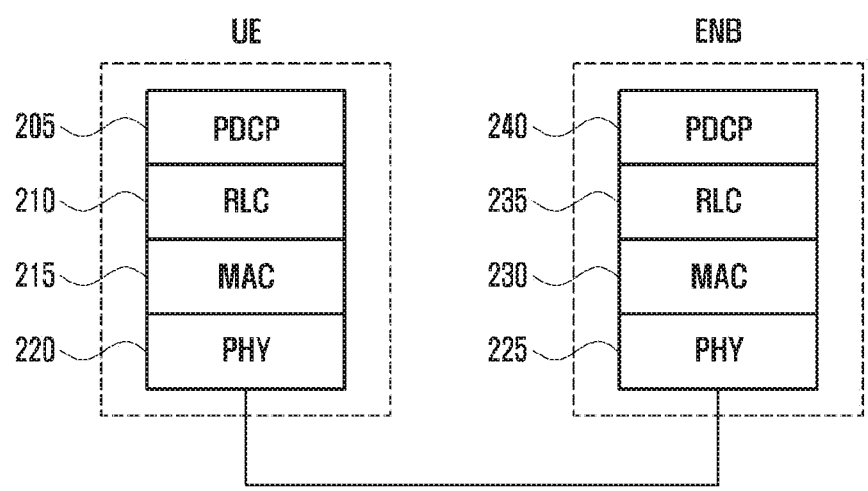
FIG. 2 is a diagram illustrating a radio protocol structure in the LTE system to which the present invention is applied.

FIG. 2 is a diagram illustrating a radio protocol structure in the LTE system to which the present invention is applied.

Referring to FIG. 2, in each of the UE and the eNB, the radio protocol stack of the LTE system is composed of a packet data convergence protocol (PDCP) layer 205 or 240, a radio link control (RLC) layer 210 or 235, a medium access control (MAC) layer 215 or 230, and a physical layer (PHY) 220 or 225.

The PDCP layer 205 or 240 performs an operation such as IP header compression/decompression.

The RLC layer 210 or 235 performs an ARQ operation or the like by reassembling a PDCP packet data unit (PDCP PDU) received from the PDCP layer in a suitable size.

The MAC layer 215 or 230 is connected with several RLC layer apparatuses included in one UE and performs an operation of multiplexing the RLC PDUs received from the RLC layer into a MAC PDU and demultiplexing the RLC PDUs from the MAC PDU.

The PHY 220 or 225 performs an operation of channel-coding and modulating upper layer data and then transmitting OFDM symbols thereof to the radio channel, or an operation of demodulating and channel-decoding OFDM symbols received through the radio channel and then delivering them to the upper layer. Also, the PHY uses hybrid ARQ (HARQ) for additional error correction, and a receiving entity transmits one bit to a transmitting entity to notify whether a packet is received or not. This is referred to as HARQ acknowledge (ACK)/negative acknowledge (NACK) information.

The downlink HARQ ACK/NACK information for the uplink transmission may be transmitted through a physical hybrid-ARQ indicator channel (PHICH), and the uplink HARQ ACK/NACK information for the downlink transmission may be transmitted through a physical uplink control channel (PUCCH) or a PUSCH physical channel.

Figure 3:
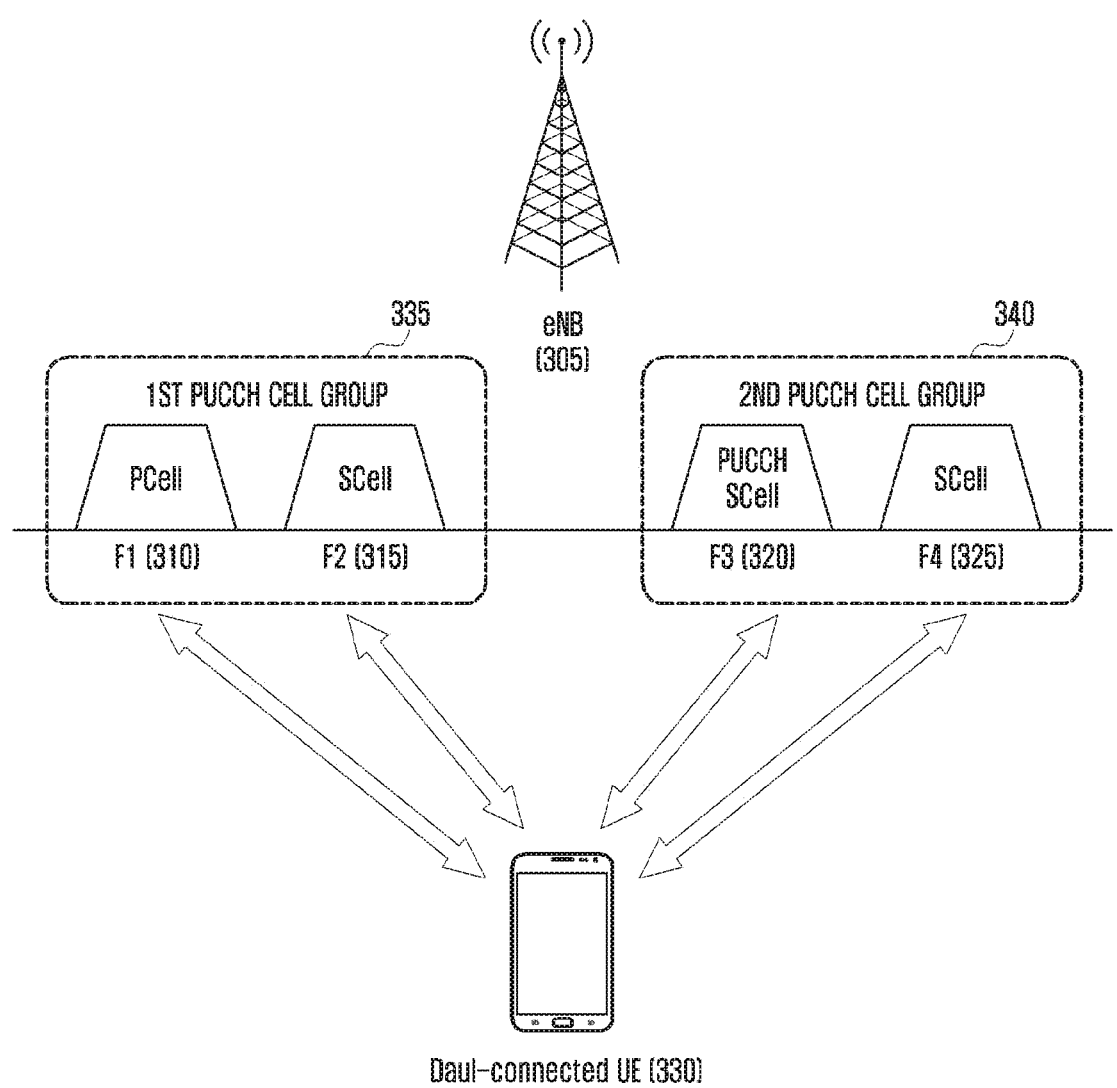
FIG. 3 is a diagram illustrating improved carrier aggregation in a terminal.

FIG. 3 is a diagram illustrating improved carrier aggregation in a terminal.

Referring to FIG. 3, one eNB generally transmits and receives multiple carriers over several frequency bands. For example, when the eNB 305 transmits uplink carriers for four cells, typically one UE transmits and receives data by using one of the plurality of cells. However, the UE that uses a carrier aggregation technique may transmit and receive data by using several carriers at the same time. The eNB 305 may allocate, depending on a situation, a plurality of carriers to the UE 330 using the carrier aggregation technique and thereby increase the data transmission rate of the UE 330.

One forward carrier and one reverse carrier transmitted and received at one eNB constitute one cell, and the carrier aggregation technique may mean that one UE transmits and receives data simultaneously through a plurality of cells. Therefore, the maximum data transmission rate increases in proportion to the number of carriers aggregated. In the LTE Rel-10 carrier aggregation technique, the eNB can configure the UE to transmit and receive data through up to five cells. In this case, one of such cells necessarily has a PUCCH. A cell having the PUCCH is referred to as a primary cell (PCell), and the remaining cells having no PUCCH are referred to as a secondary cell (SCell). In addition to having the PUCCH, the PCell should be able to perform all traditional functions of a serving cell, such as handover, RLF, and the like.

In the following description of the present invention, data reception through a certain forward carrier or data transmission through a certain reverse carrier by the UE has the same meaning as data transmission/reception using a control channel and a data channel provided in a cell corresponding to a center frequency and a frequency band that characterize the carrier. Although the following embodiments of the present invention will be described on the assumption of the LTE system for convenience of explanation, the present invention may be applied to various wireless communication systems that support the carrier aggregation.

As described above, in the Rel-10 carrier aggregation technique, only the PCell could have the PUCCH. However, if the amount of information to be delivered to the eNB through the PUCCH increases, it may be burdensome to transmit the information only on a single PUCCH. In particular, a method for transmitting and receiving data by using up to 32 carriers is being discussed in LTE Rel-13, and having the PUCCH in the SCell other than the PCell has advantages such as PUCCH loading dispersion. It is therefore being proposed to introduce the PUCCH into the SCell as well as the PCell.

For example, the PUCCH may be additionally introduced into one SCell 320 in FIG. 3. In the present invention, the SCell having the PUCCH is referred to as a PUCCH SCell. In the past, all PUCCH-related signaling was delivered to the eNB through the PCell. However, since a plurality of PUCCHs exist now, it is necessary to determine which PUCCH will be used for delivering PUCCH signaling of each SCell to the eNB.

Assuming that there are two PUCCHs as shown in FIG. 3, it will be divided into a group of cells (first PUCCH cell group 335) using the PUCCH of the PCell and a group of cells (second PUCCH cell group 340) using the PUCCH of a specific Scell. In the present invention, such a group is referred to as a PUCCH cell group. In the LTE mobile communication system, the UE reports HARQ feedback information, channel status information (CSI), and SR to the eNB through the PUCCH.

Figure 4:
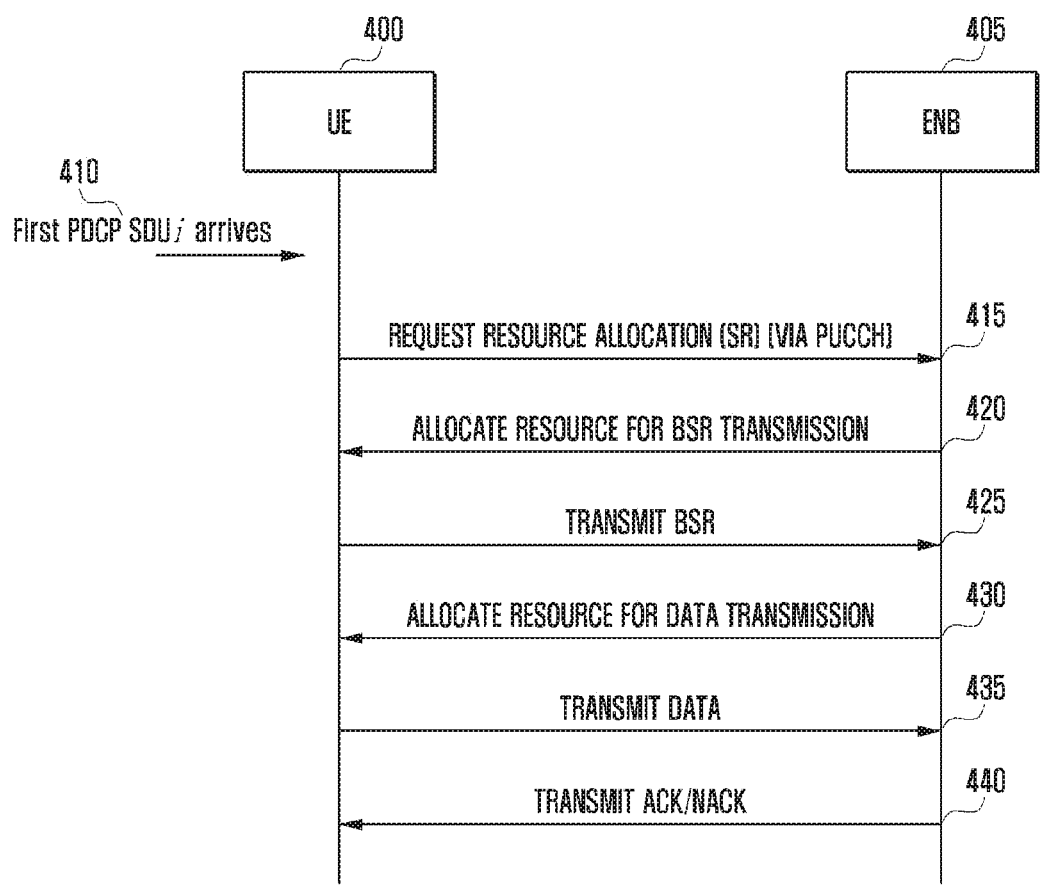
FIG. 4 is a diagram illustrating a process in which a terminal transmits an SR and is allocated a radio resource by a base station.

FIG. 4 is a diagram illustrating a process in which a terminal is allocated a radio resource by a base station.

Referring to FIG. 4, at step 410, a PDCP SDU (which will be hereinafter used together with data) to be transmitted to UE 400 is generated.

When the data is generated, the UE determines whether a radio resource for transmitting the data is allocated. If it is determined that the resource is not allocated, the UE may determine whether an available PUCCH is allocated.

If it is determined that the PUCCH is allocated, the UE may transmit, using the PUCCH, a resource allocation request or a scheduling request (referred to as an SR, hereinafter) to eNB 405 at step 415. At this time, the UE may start a timer. For example, the timer may include a scheduling request prohibition timer (sr-ProhibitTimer).

The eNB that successfully receives the SR schedules, at step 420, a radio resource for transmission of a buffer status report (hereinafter referred to as BSR) to the UE.

If the radio resource for transmission of the BSR is not scheduled, and if the timer (sr-ProhibitTimer) expires, the UE may transmit the SR again. In addition, the UE may increase an SR_COUNTER value (hereinafter, referred to as a counter value) by 1 every SR transmission attempt. If the counter value becomes equal to a predetermined value (dsr-TransMax value), the UE may attempt a random access to the eNB. The dsr-TransMax value may be set for the UE by the eNB, and may have one value of (4, 8, 16, 32, 64).

At step 425, the UE that receives a radio resource schedule for BSR transmission may transmit the BSR by using the allocated radio resource. At this time, the BSR may be used to inform the eNB about the amount of data to be transmitted by the UE.

At step 430, the eNB that receives the BSR may allocate a radio resource for transmission of the PDCP SDU.

At step 435, the UE that is allocated the radio resource for data transmission may transmit the data to the eNB.

Thereafter, at step 440, the eNB may transmit ACK/NACK information for the data.

Using the SR radio resource periodically allocated, the UE may transmit the SR to the eNB. As shown in Table 1, the SR radio resource may be allocated to the PUCCH at periods of at least 1 ms to at most 80 ms.

TABLE 1

SR period and subframe offset configuration information

| SR configuration Index ISR | SR periodicity (ms) SRPERIODICITY | SR subframe offset NOFFSET, SR |
|---|---|---|
| 0-4 | 5 | ISR |
| 5-14 | 10 | ISR − 5 |
| 15-34 | 20 | ISR − 15 |
| 35-74 | 40 | ISR − 35 |
| 75-154 | 80 | ISR − 75 |
| 155-156 | 2 | ISR − 155 |
| 157 | 1 | ISR − 157 |

The SR period is related to a delay time. If the SR period is configured to be short, the UE may transmit its own SR to the eNB as soon as possible. However, as the SR period is configured to be shorter, the share of resources to be allocated for the SR in the PUCCH radio resources increases.

TABLE 2

PUCCH radio resource share according to SR period

| | | Number of UEs with the SR configured | | | | |
|---|---|---|---|---|---|---|
| | | 18 | 36 | 72 | 144 | 288 |
| SR periodicity | 1 | 2.00% | 4.00% | 8.00% | 16.00% | 32.00% |
| | 2 | 1.00% | 2.00% | 4.00% | 8.00% | 16.00% |
| | 5 | 0.40% | 0.80% | 1.60% | 3.20% | 6.40% |
| | 10 | 0.20% | 0.40% | 0.80% | 1.60% | 3.20% |
| | 20 | 0.10% | 0.20% | 0.40% | 0.80% | 1.60% |
| | 40 | 0.05% | 0.10% | 0.20% | 0.40% | 0.80% |
| | 80 | 0.03% | 0.05% | 0.10% | 0.20% | 0.40% |

Table 2 shows the share of PUCCH radio resources according to the SR period. When the SR period is 10 ms or more, the share is low regardless of the number of UEs. However, if the SR period is set as short as 1 to 5 ms, the share increases. This means that the amount of radio resources usable for HARQ feedback information and CSI information in addition to the SR is reduced. Therefore, it is desirable to allow the SR to be transmitted in the PUCCH of the SCell as well in order to reduce the share while minimizing the delay time. Accordingly, the present invention assumes a case where the UE transmits the scheduling request (SR) in a plurality of cells having the PUCCH in the LTE mobile communication system. In this case, when resources for SR transmission are simultaneously allocated to subframes having the same time point in at least two cells, it is a matter of which cell the UE transmits the SR.

Figure 5:
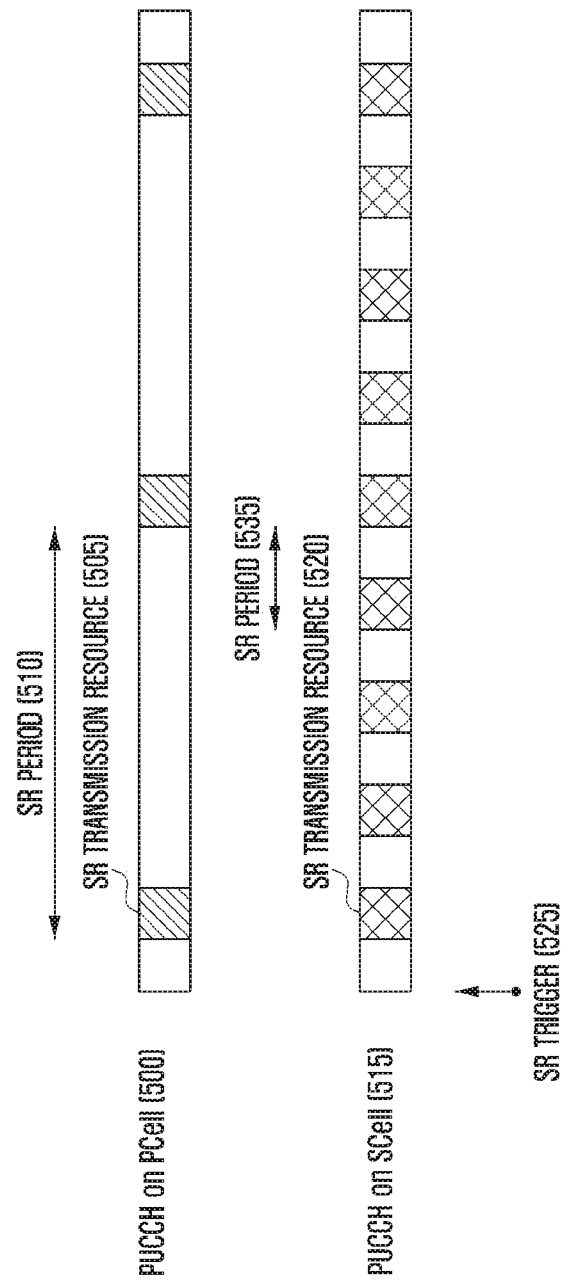
FIG. 5 is a diagram illustrating a method for transmitting an SR proposed by the present invention.

FIG. 5 is a diagram illustrating a method for transmitting an SR proposed by the present invention.

Although this figure is illustrated on the assumption that there are two serving cells, the number of serving cells is not limited to two. Referring to FIG. 5, it is assumed that the PUCCH is provided on two serving cells, namely, a PCell 500 and one SCell 515. An SR period 510 of SR transmission resources 505 in the PUCCH of the PCell does not need to be identical with an SR period 535 of SR transmission resources 520 in the PUCCH of the SCell.

Meanwhile, the present invention assumes a situation where a location 505 of the SR transmission resource in the PUCCH of the first cell and a location 520 of the SR resource in the PUCCH of the second cell are allocated to the same time point. In this case, when data or the like is generated in the UE, the SR transmission may be triggered 525.

When the SR transmission is triggered, the UE determines in which cell the SR is to be transmitted, based on the following conditions. In this case, the first cell and the second cell may be cells capable of transmitting an arbitrary PUCCH, and need not correspond to the PCell 500 and the SCell 515, respectively.

First of all, the UE determines whether to transmit the SR according to the 0th (zero-th) rule. The 0th rule may refer to a criterion for determining whether to transmit the SR, depending on whether there is a conflict with a measurement gap (hereinafter referred to as MG). The conflict between the MG and the SR transmission resource may mean that a TTI to which the SR transmission resource is allocated is a part of the MG (or the TTI to which the SR transmission resource is allocated is included in the MG). Hereinafter, in the present invention, a conflict between the SR transmission resource and a resource for transmitting any other uplink signal may mean that a subframe in which the uplink signal is transmitted and a subframe to which the SR transmission resource is allocated (or configured) are identical or overlapped with each other on the time axis. Alternatively, it means that the two subframes have the same SFN and the same subframe number.

If all the SR transmission resources of the two cells for transmission of the PUCCH conflict with the MG, the UE may defer the SR transmission. Alternatively, if the SR transmission resource of only one cell conflicts with the MG, the UE may transmit the SR in the SR transmission resource of the serving cell that does not conflict with the MG. If all the SR transmission resources of the two cells do not conflict with the MG, the UE may apply the first rule below. That is, the UE may select a cell to transmit the SR according to the first rule.

According to the first rule, the UE may determine a cell to transmit the SR, depending on whether there is a conflict with a HARQ feedback transmission resource of the PUCCH and a CSI transmission resource in each cell. If the SR transmission resources allocated in the first cell and the second cell do not conflict with the HARQ feedback transmission resource or the CSI transmission resource, the UE may apply the second rule below. That is, the UE may transmit a cell to transmit the SR according to the second rule.

On the other hand, if the SR transmission resource of one of two cells conflicts with the HARQ feedback transmission resource or the CSI transmission resource, the UE may transmit the SR by using the SR transmission resource of the non-conflicting cell. Meanwhile, when all the SR transmission resources allocated in the first cell and the second cell conflict with the HARQ feedback transmission resource or the CSI transmission resource, the UE complies with the following condition.

If the SR transmission resource of the first cell conflicts with the HARQ feedback transmission resource and if the SR transmission resource of the second cell conflicts with the CSI transmission resource, the UE may transmit the SR in the SR transmission resource of the first cell. This is because if the CSI transmission resource of the PUCCH and the SR transmission resource are allocated to the same subframe (conflict), the UE cannot simultaneously transmit the SR and the CSI, but if the HARQ feedback transmission resource and the SR transmission resource are allocated to the same subframe (conflict), the UE can transmit both the SR and the HARQ feedback.

In more detail, if the HARQ feedback transmission resource and the SR transmission resource are simultaneously allocated to the same subframe, the UE may transmit HARQ feedback information in the SR transmission resource. In this case, the eNB may measure the transmission energy of the SR transmission resource and thereby identify that there is data to be sent by the UE. This corresponds to a case where the eNB allocates PUCCH format 1a or 1b. Alternatively, the eNB may allocate a resource capable of simultaneously transmitting the HARQ feedback and the SR. In this case, the UE may simultaneously transmit both information in the corresponding resource. This corresponds to a case where the eNB allocates PUCCH format 3. Accordingly, when the HARQ feedback transmission resource and the SR transmission resource conflict with each other, the UE may transmit both the HARQ feedback and the SR without deterioration of the performance of the HARQ feedback. Thus, it may be better to transmit the HARQ feedback and the SR in the same cell rather than transmit in different cells. Therefore, the UE may transmit the SR information in the first cell which conflicts with the HARQ feedback.

If both the SR transmission resource of the first cell and the transmission resource of the second cell conflict with the HARQ feedback transmission resource, the UE may apply the third rule below. That is, the UE may select a cell to transmit the SR according to the third rule.

On the other hand, if both the transmission resource of the first cell and the transmission resource of the second cell conflict with the CSI transmission resource, the UE may abandon the CSI transmission and perform the SR transmission in one of the two cells. This is because the UE cannot transmit the SR and the CSI in subframes having the same time point. Therefore, considering information amount of the CSI, a channel state, or the like, the UE may abandon the CSI transmission and perform SR transmission in any one of two cells.

Further, the first rule may be further subdivided as follows.

The rule 1-1 may be determined depending on whether there is a conflict between the CSI transmission resource and the SR transmission resource.

If both the SR transmission resource of the first cell and the SR transmission resource of the second cell conflict with the CSI transmission resource, the UE may abandon the CSI transmission and transmit the SR in any one of the two cells. In this case, the UE may abandon the transmission of CSI having a small amount of information to be transmitted. Alternatively, the UE may abandon the CSI transmission of a channel having a poor channel state and transmit the SR. However, this is only exemplary, and the UE may select, based on a predetermined rule, the CSI to abandon transmission.

On the other hand, if the SR transmission resource of the first cell conflicts with the CSI transmission resource and if the SR transmission resource of the second cell does not conflict with the CSI transmission resource, the UE may transmit the SR in the SR transmission resource of the second cell.

In addition, if neither the SR transmission resource of the first cell nor the SR transmission resource of the second cell conflicts with the CSI transmission resource, the UE may select a cell to transmit the SR according to the rule 1-2.

The rule 1-2 may be determined depending on whether there is a conflict between the HARQ feedback transmission resource and the SR transmission resource.

If both the SR transmission resource of the first cell and the SR transmission resource of the second cell do not conflict with the HARQ feedback transmission resource, the UE may apply the second rule. In addition, if both the SR transmission resource of the first cell and the SR transmission resource of the second cell conflict with the HARQ feedback transmission resource, the UE may select a cell to transmit the SR according to the second rule.

On the other hand, if the SR transmission resource of the first cell conflicts with the HARQ feedback transmission resource and if the SR transmission resource of the second cell does not conflict with the HARQ feedback transmission resource, the UE may transmit the SR in the SR transmission resource of the first cell which conflicts with the HARQ feedback transmission resource.

As described above, the gist of the first rule is that, if the SR transmission resources of two serving cells are allocated to subframes having the same time point, and if the SR transmission resource conflicts with the HARQ feedback transmission resource or the CSI transmission resource in at least one serving cell, a serving cell to perform the SR transmission is selected according to the type of PUCCH transmission.

Specifically, if the PUCCH is HARQ feedback, the UE performs the HARQ feedback transmission and the SR transmission in the same serving cell, whereas if the PUCCH is CSI, the UE performs the CSI transmission and the SR transmission in different serving cells.

The second rule may be determined depending on whether there is a conflict with a sounding reference signal (SRS). The SRS is a reference signal transmitted on uplink by the UE, and may be used by the eNB to measure an uplink signal quality.

If the SR transmission resource conflicts with the SRS transmission resource in only one of the first and second cells, the SR transmission may be performed in the SR transmission resource of the non-conflicting cell. This is because there is a possibility that the SRS transmission will be dropped when the SRS transmission and the SR transmission conflict with each other.

If both the SR transmission resource of the first cell and the SR transmission resource of the second cell conflict or do not conflict with the SRS transmission resource, a cell to transmit the SR may be selected according to the following third rule.

The third rule is determined depending on whether there is a conflict with the PUSCH retransmission.

If the PUSCH retransmission is scheduled in both the first cell and the second cell, or if the PUSCH retransmission is not scheduled in both the first cell and the second cell, a cell to transmit the SR may be selected according to the fourth rule.

On the other hand, if there is a conflict with the PUSCH retransmission in the first cell, and if there is no conflict with the PUSCH retransmission in the second cell, the UE may transmit the SR in the serving cell having no conflict with the PUSCH retransmission.

The fourth rule is as follows. The SR may be transmitted in a cell having a small signal attenuation (Pathloss) with the eNB, in a cell having low required transmission power (so as to minimize transmission power consumption), in a serving cell that has most recently transmitted a signal (so as to prevent the SR from being transmitted alternately in several serving cells), or in a predetermined serving cell. The predetermined serving cell may be, for example, the PCell or the PUCCH SCell.

Figure 6:
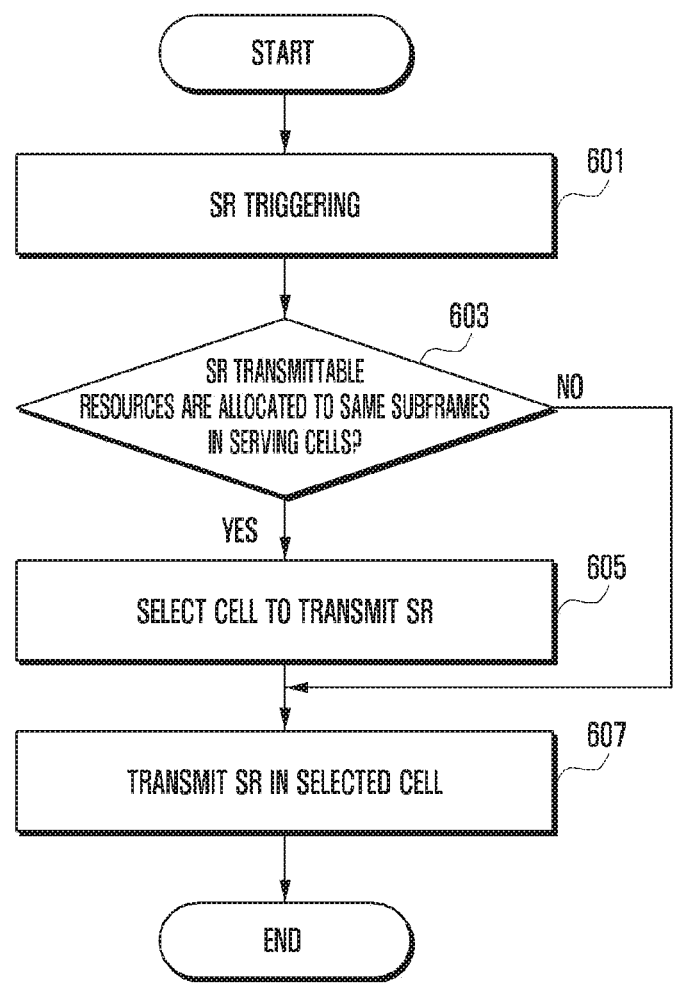
FIG. 6 is a diagram illustrating an operation of a terminal to which an SR transmission method proposed by the present invention is applied.

FIG. 6 is a diagram illustrating an operation of a terminal to which an SR transmission method proposed by the present invention is applied.

Referring to FIG. 6, when new data is generated in the UE, the SR transmission may be triggered at step 601.

If the SR transmission is triggered, the UE determines at step 603 whether resources (SR transmission resources) capable of transmitting the SR are allocated to subframes having the same time point in a plurality of serving cells (carriers).

If the SR transmission resources are not allocated to the subframes having the same time point in the plurality of serving cells, the UE transmits at step 607 the SR in the serving cell to which the SR transmission resource is allocated.

On the other hand, if the SR transmission resources are allocated to the subframes having the same time point in the plurality of serving cells, the UE may select at step 605 a serving cell to transmit the SR. The procedure for selecting the serving cell to transmit the SR will be described in detail in FIGS. 7A to 7E.

At step 607, the UE that selects the serving cell for SR transmission transmits the SR in the selected serving cell.

FIGS. 7A to 7E are diagrams illustrating a method for selecting a cell for transmitting an SR proposed by the present invention.

Figure 7A:
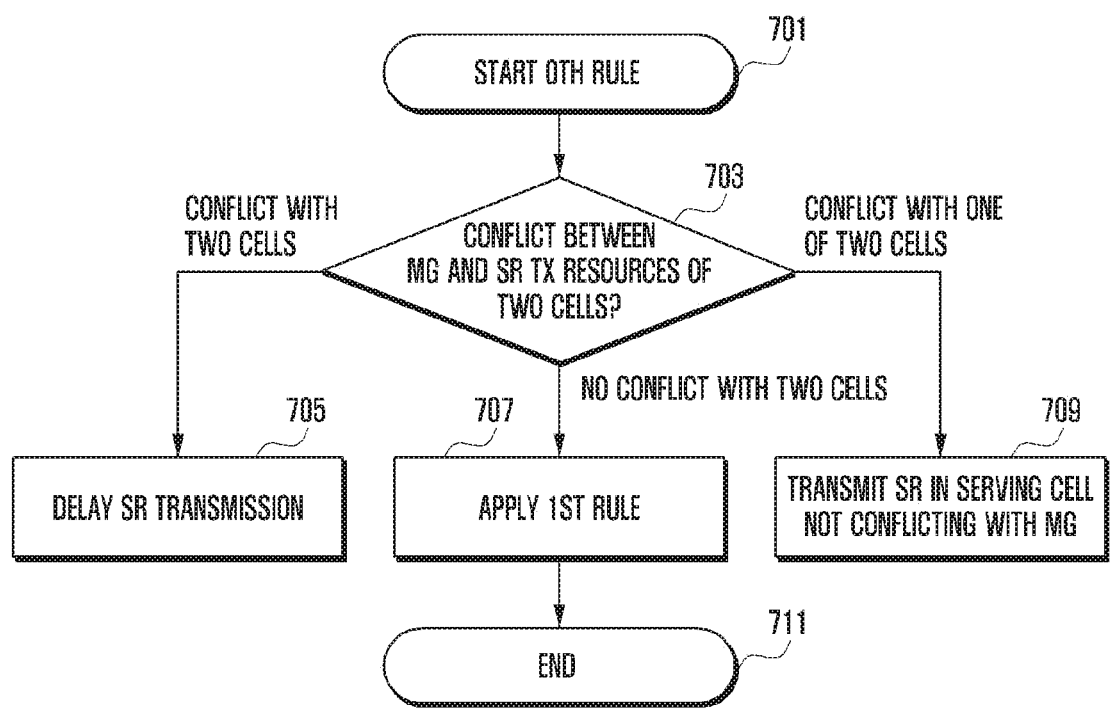

FIG. 7A illustrates a method for UE to select a cell for transmitting an SR according to the zero-th rule.

When resources capable of transmitting the SR are allocated to subframes having the same time point in a plurality of serving cells as in step 605 of FIG. 6, the UE may determine at step 701 whether to transmit the SR, based on the first 0th rule.

At step 703, the UE may determine whether the SR transmission resources of two cells conflict with the MG, based on the 0th rule.

If all the SR transmission resources of the two cells in which the PUCCH is transmitted collide with the MG, the UE may defer the SR transmission at step 705.

Alternatively, if the SR transmission resource of only one of the two cells collides with the MG, the UE may transmit at step 709 the SR in the SR transmission resource of the serving cell that does not conflict with the MG.

On the other hand, if all the SR transmission resources of the two cells do not conflict with the MG, the UE may select a cell to transmit the SR according to the following first rule at step 707.

FIG. 7B illustrates a method for the UE to select a cell for transmitting the SR according to the first rule.

As described above, if all the SR transmission resources of two cells do not conflict with the MG, the UE may select a cell to transmit the SR according to the following first rule.

The first rule is determined depending on whether the HARQ feedback transmission resource and the CSI transmission resource in the PUCCH conflict with the SR transmission resources of two cells.

At step 723, the UE may determine whether the CSI transmission resource and the SR transmission resource conflict with each other.

If it is determined that both the SR transmission resource of the first cell and the SR transmission resource of the second cell conflict with the CSI transmission resource, the UE may abandon the CSI transmission and transmit the SR in any one of the two cells at step 725. In this case, the UE may abandon the transmission of CSI having a small amount of information to be transmitted. Alternatively, the UE may abandon the CSI transmission of a channel having a poor channel state and transmit the SR. However, this is only exemplary, and the UE may select, based on a predetermined rule, the CSI to abandon transmission.

On the other hand, if the SR transmission resource of the first cell conflicts with the CSI transmission resource and if the SR transmission resource of the second cell does not conflict with the CSI transmission resource, the UE may transmit the SR in the SR transmission resource of the second cell at step 729.

Meanwhile, if both the SR transmission resource of the first cell and the SR transmission resource of the second cell do not conflict with the CSI transmission resource, the UE may determine at step 727 whether the HARQ feedback transmission resource conflicts with the SR transmission resource.

If the SR transmission resource of the first cell conflicts with the HARQ feedback transmission resource and if the SR transmission resource of the second cell does not conflict with the HARQ feedback transmission resource, the UE may transmit at step 733 the SR in the SR transmission resource of the first cell which conflicts with the HARQ feedback transmission resource. This is because the UE can simultaneously transmit the HARQ feedback and the SR as described above.

On the other hand, if both the SR transmission resource of the first cell and the SR transmission resource of the second cell conflict or do not collide with the HARQ feedback transmission resource, the UE applies the second rule at step 731.

Figure 7C:
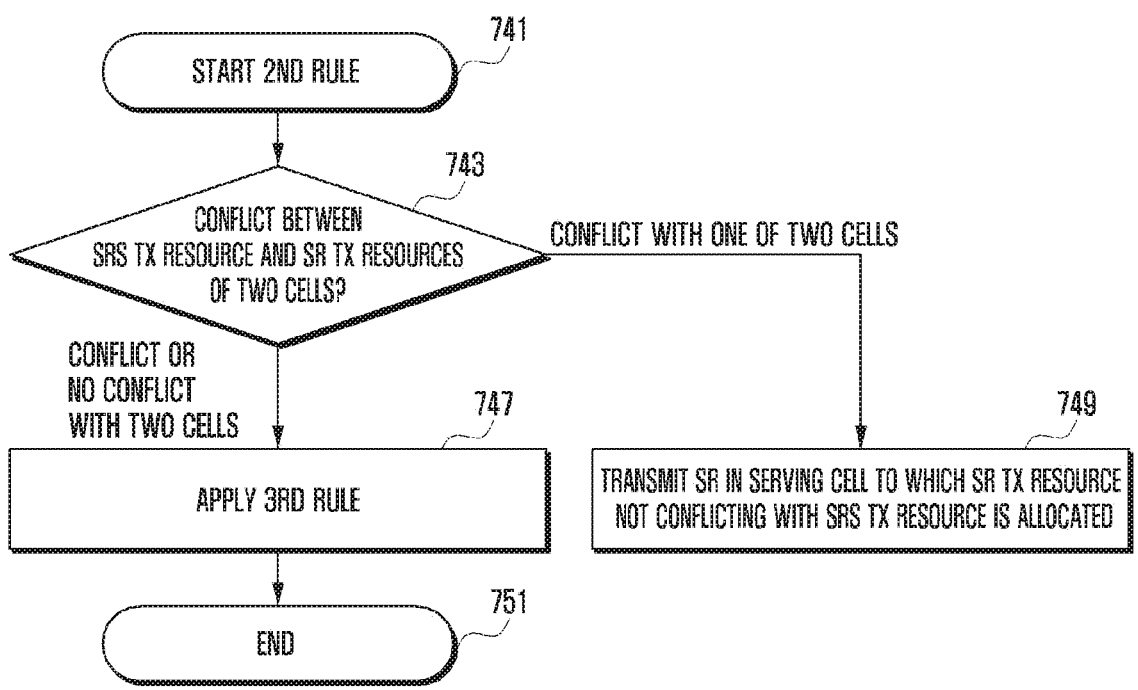

FIG. 7C illustrates a method for the UE to select a cell for transmitting the SR according to the second rule.

The second rule is determined depending on a conflict between the SRS transmission resource and the SR transmission resource at step 743.

If one of the SR transmission resource of the first cell and the SR transmission resource of the second cell conflicts with the SRS transmission resource, the UE may transmit at step 749 the SR in a cell to which the SR transmission resource which does not conflict with the SRS transmission resource is allocated. This is because there is a possibility that the SRS transmission will be dropped when the SRS transmission and the SR transmission conflict with each other.

On the other hand, if both the SR transmission resource of the first cell and the SR transmission resource of the second cell conflict or do not conflict with the SRS transmission resource, the UE may determine at step 747 a cell for transmitting the SR according to the following third rule.

Figure 7D:
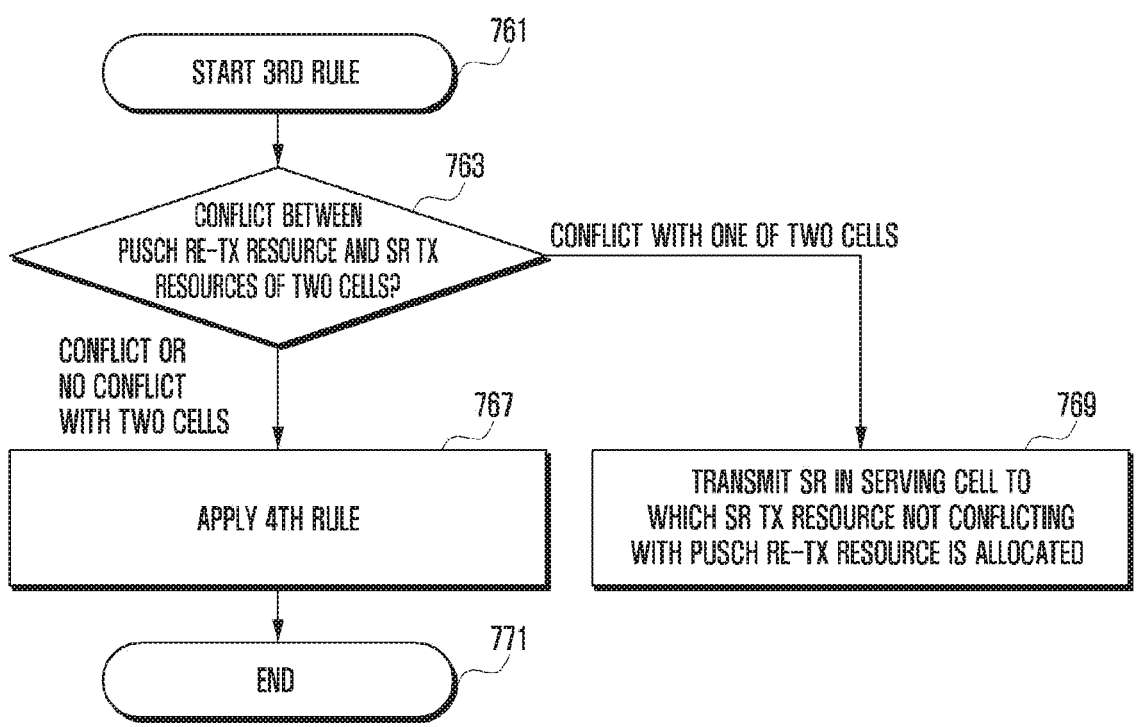

FIG. 7D illustrates a method for the UE to select a cell for transmitting the SR according to the third rule.

The third rule is determined depending on whether a conflict with the PUSCH retransmission at step 763.

If the SR transmission resource of the first cell conflicts with the PUSCH retransmission resource and if the SR transmission resource of the second cell does not conflict with the PUSCH retransmission, the UE may transmit at step 769 the SR in a serving cell that does not conflict with the PUSCH retransmission. Alternatively, in order to lower the transmission power, it is possible to also transmit the SR in a serving cell that conflicts with the PUSCH retransmission.

If the PUSCH retransmission is scheduled or not scheduled in both the first cell and the second cell, the UE may determine a cell for transmitting the SR according to the fourth rule at step 767.

Figure 7E:
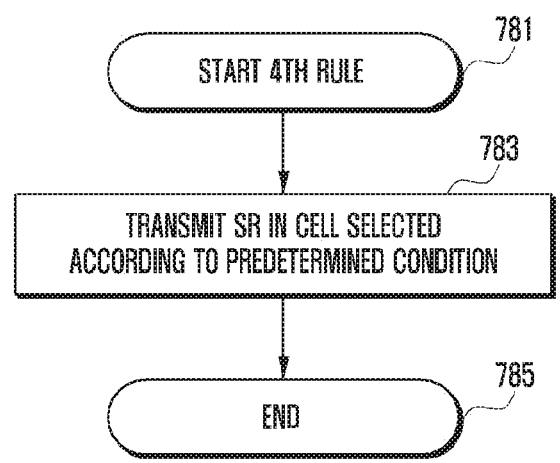

FIG. 7E illustrates a method for the UE to select a cell for transmitting the SR according to the fourth rule.

In the fourth rule, the UE selects a serving cell for transmitting the SR according to a predetermined condition and then transmits the SR at step 783. The predetermined condition is as follows.

The SR may be transmitted in a cell having a small signal attenuation (Pathloss) with the eNB, in a cell having low required transmission power, in a serving cell that has most recently transmitted the SR, or in a predetermined serving cell.

Meanwhile, according to the second embodiment of the present invention, the UE may use a discontinuous reception (DRX) function in order to reduce power consumption instead of continuously receiving a signal from the eNB. In the DRX defined in Release 8 of LTE, the UE may perform a DRX operation with a cycle of 10 ms to 2560 ms. Also, in Release 13, in order to further reduce power consumption, it is considered to increase the DRX cycle up to 10.24 seconds.

However, typical signaling transmitted to the UE for setting the DRX function cannot omit (i.e., mandatory present) cycle information of 10 ms to 2560 ms. Accordingly, when the cycle up to 10.24 seconds is used, a method for indicating both new cycle information and typical cycle information is needed.

Figure 8:
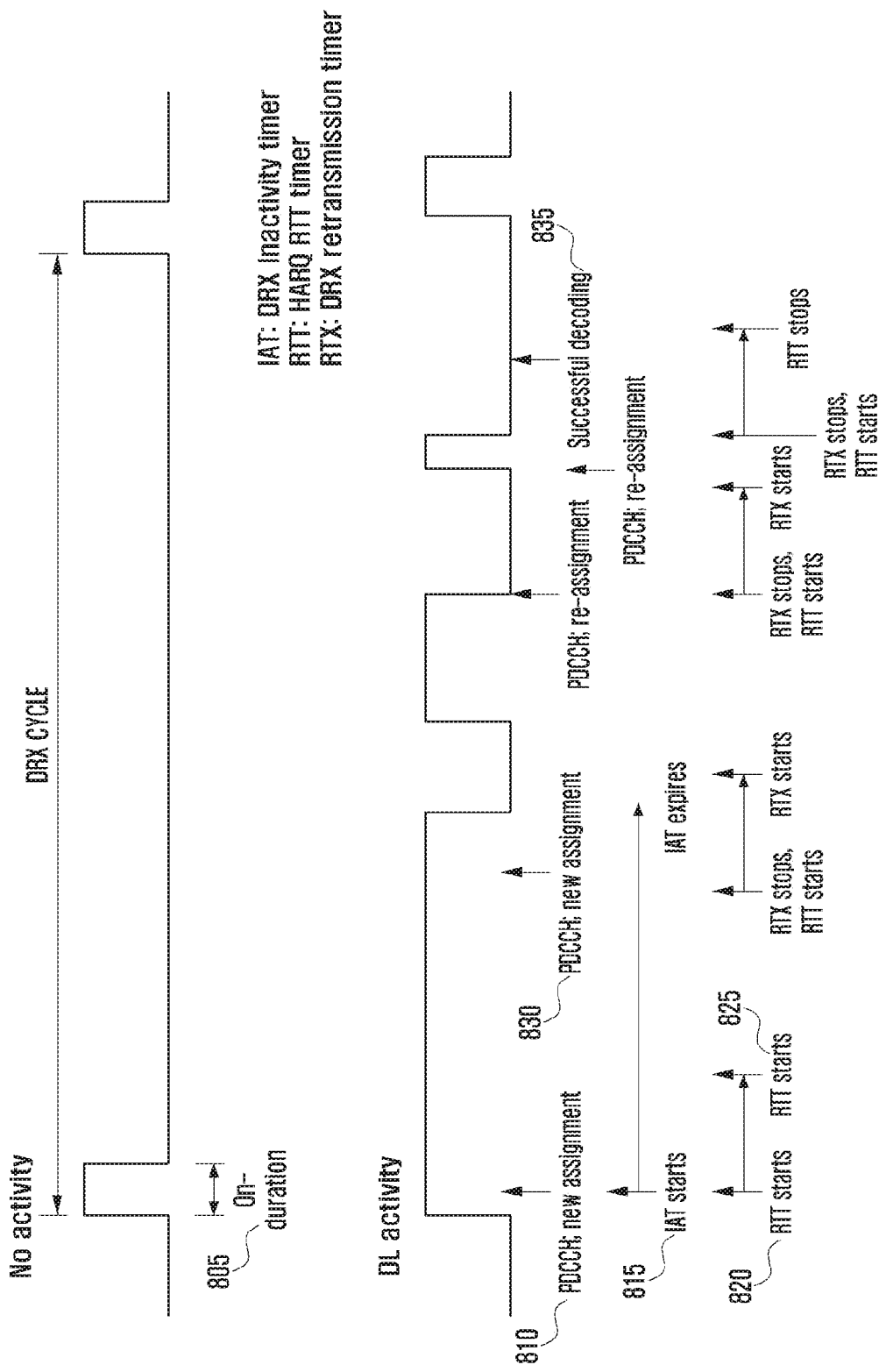
FIG. 8 is a diagram illustrating a discontinuous reception (DRX) operation of a terminal.

FIG. 8 is a diagram illustrating a discontinuous reception (DRX) operation of a terminal.

The LTE UE may use the DRX function according to configuration of the eNB in order to minimize power consumption. The UE to which the DRX is applied may monitor scheduling information in only a predetermined physical downlink control channel (PDCCH) in order to acquire the scheduling information. The DRX may operate in both an idle mode and a connection mode, but operation methods are somewhat different. The present invention relates to the connection mode.

In order to reduce the power consumption of the UE, the UE may operate in the DRX. The DRX operation has a DRX cycle 800 and may monitor the PDCCH only for an on-duration 805. In the connection mode, the DRX cycle is set to two values, namely, long DRX and short DRX. In general, a long DRX cycle is applied, and if necessary, the eNB may trigger a short DRX cycle by using a MAC control element (CE). After a certain time, the UE changes the DRX operation from the short DRX cycle to the long DRX cycle. Initial scheduling information of specific UE is provided in a predetermined PDCCH only. Therefore, the UE may periodically monitor only the PDCCH, thereby minimizing power consumption.

If scheduling information 810 for a new packet is received by the PDCCH for the on-duration 805, the UE starts a DRX inactivity timer 815. The UE may maintain an active state during the DRX inactivity timer. That is, the UE may continue PDCCH monitoring.

In addition, the UE may start an HARQ RTT timer 820. The HARQ RTT timer 820 is applied to prevent the UE from unnecessarily monitoring the PDCCH during an HARQ round trip time (RTT), and the UE does not need to perform the PDCCH monitoring during the timer operation time. However, while the DRX inactivity timer and the HARQ RTT timer are operating simultaneously, the UE continues the PDCCH monitoring, based on the DRX inactivity timer.

When the HARQ RTT timer expires, a DRX retransmission timer 825 may be started. While the DRX retransmission timer is operating, the UE should perform the PDCCH monitoring. Normally, during the DRX retransmission timer operation time, scheduling information 830 for HARQ retransmission is received. Upon receiving the scheduling information, the UE immediately stops the DRX retransmission timer and starts the HARQ RTT timer again. The above operation continues until the packet is successfully received 835.

The configuration information related to the DRX operation in the connection mode is sent to the UE via the RRCConnection Reconfiguration message. The RRCConnection Reconfiguration message is as follows.

```
DRX-Config ::=           CHOICE {
    release                  NULL,
    setup                    SEQUENCE {
        onDurationTimer          ENUMERATED {
                                     psf1, psf2, psf3, psf4, psf5, psf6,
                                     psf8, psf10, psf20, psf30, psf40,
```

```
                                            psf50, psf60, psf80, psf100,
                                            psf200},
    drx-InactivityTimer                 ENUMERATED {
                                            psf1, psf2, psf3, psf4, psf5, psf6,
                                            psf8, psf10, psf20, psf30, psf40,
                                            psf50, psf60, psf80, psf100,
                                            psf200, psf300, psf500, psf750,
                                            psf1280, psf1920, psf2560, psf0-v1020,
                                            spare9, spare8, spare7, spare6,
                                            spare5, spare4, spare3, spare2,
                                            spare1},
    drx-RetransmissionTimer             ENUMERATED {
                                            psf1, psf2, psf4, psf6, psf8, psf16,
                                            psf24, psf33},
    longDRX-CycleStartOffset            CHOICE {
        sf10                                INTEGER(0..9),
        sf20                                INTEGER(0..19),
        sf32                                INTEGER(0..31),
        sf40                                INTEGER(0..39),
        sf64                                INTEGER(0..63),
        sf80                                INTEGER(0..79),
        sf128                               INTEGER(0..127),
        sf160                               INTEGER(0..159),
        sf256                               INTEGER(0..255),
        sf320                               INTEGER(0..319),
        sf512                               INTEGER(0..511),
        sf640                               INTEGER(0..639),
        sf1024                              INTEGER(0..1023),
        sf1280                              INTEGER(0..1279),
        sf2048                              INTEGER(0..2047),
        sf2560                              INTEGER(0..2559)
    },
    shortDRX                            SEQUENCE {
        shortDRX-Cycle                      ENUMERATED {
                                                sf2, sf5, sf8, sf10, sf16, sf20,
                                                sf32, sf40, sf64, sf80, sf128, sf160,
                                                sf256, sf320, sf512, sf640},
        drxShortCycleTimer                  INTEGER (1..16)
    }          OPTIONAL                                            -- Need OR
    }
}
DRX-Config2
    longDRX-CycleStartOffset-r13        CHOICE {
        sf5120-r13                          INTEGER(0..5119),
        sf10240-r13                         INTEGER(0..10239)
}
```

Referring to the RRCConnection Reconfiguration message, values of an on-duration timer (onDurationTimer), a DRX inactivity timer (drx-InactivityTimer), a DRX retransmission timer (drx-RetransmissionTimer), a short DRX cycle (shortDRX-Cycle), and a short DRX cycle timer (drxShortCycleTimer) may be defined as the number of PDCCH subframes. If subframes corresponding to the defined number of PDCCH subframes pass after the timer starts, the timer may expire.

In the FDD, all downlink subframes belong to the PDCCH subframe, and in the TDD, a downlink subframe and a special subframe correspond to this.

In the TDD, a downlink subframe, an uplink subframe, and a special subframe exist in the same frequency band. Among them, the downlink subframe and the special subframe are regarded as the PDCCH subframe.

In order to support a DRX cycle longer than a typical DRX cycle value, the second embodiment of the present invention proposes a method for the eNB to deliver eDRX-related parameters to the UE by using first DRX-config (which will be hereinafter used together with first cycle information) and second DRX-config (which will be hereinafter used together with second cycle information).

In the first DRX-config, intended values may be set for the onDurationTimer, the drx-InactivityTimer, the drx-Retransmissiontimer, the shortDRX-Cycle, and the drxShortCycleTimer, and then transmitted.

However, the eNB may set a predetermined value, sf10, for a long DRX cycle start offset (longDRX-CycleStartOffset) of the first DRX-config. Since the ongDRX-CycleStartOffset value should be transmitted unconditionally and since the number of required bits varies according to the size of the value, the eNB may set the longDRX-CycleStartOffset value as sf10 and transmit it to the UE so as to use as few bits as possible. For example, signaling of sf1024 requires 10 bits, but signaling of sf10 requires 4 bits.

In addition, the eNB may set a desired DRX cycle value for the longDRX-CycleStartOffset of the second DRX-config.

When the UE receives the first DRX-config and the second DRX-config at the same time, the UE may ignore the longDRX-CycleStartOffset value of the first DRX-config and operate according to the longDRX-CycleStartOffset value which is set in the second DRX-config. Therefore, using the second DRX-config, it is possible to support DRX cycles having lengths of 5.12 seconds and 10.24 seconds.

Figure 9:
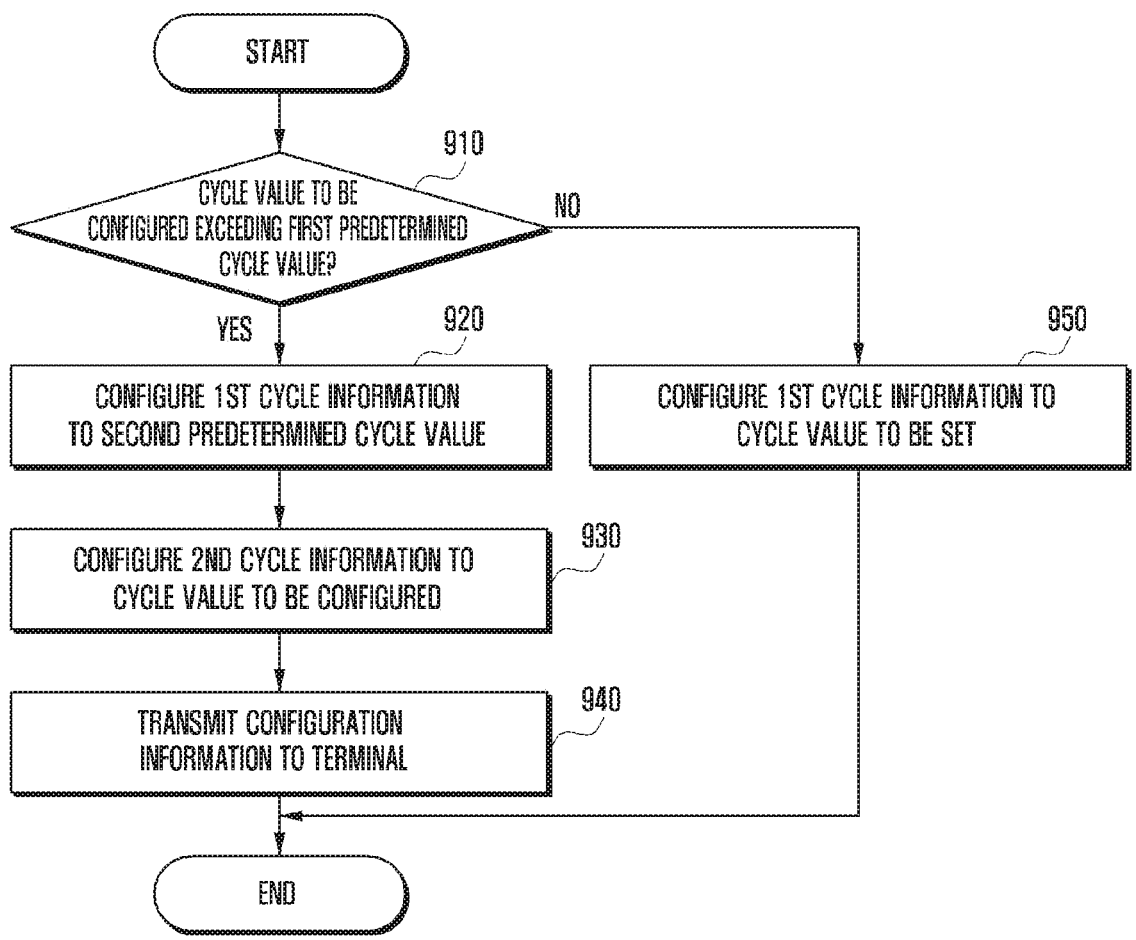
FIG. 9 is a diagram illustrating an operation of a base station according to a second embodiment of the present invention.

FIG. 9 is a diagram illustrating an operation of a base station according to a second embodiment of the present invention.

Referring to FIG. 9, at step 910, the eNB may determine whether a cycle value to be set for a DRX operation of the UE exceeds a first predetermined cycle value.

The first predetermined cycle value may refer to the maximum value of the typical DRX cycle and may refer to 2560 ms.

When the cycle value to be set exceeds the first predetermined cycle value, typical signaling transmitted to the UE in order to set the DRX function cannot set a cycle exceeding the predetermined value to the UE. Therefore, the eNB should set new cycle information.

However, the eNB cannot omit cycle information included in the typical signaling transmitted to the UE in order to set the DRX function, so that the eNB may set, at step 720, the first cycle information, which is cycle information included in the typical signaling, to a predetermined cycle value.

In this case, since the first cycle information is not used by the UE, the eNB may set a cycle value of the smallest bits to the first cycle information. For example, the eNB may set the first period information to 10 ms.

Then, at step 730, the eNB may set the second cycle information to the cycle value to be set.

At step 740, the eNB that sets the first cycle information and the second cycle information may transmit the configuration information including the first cycle information and the second cycle information to the UE in order to set the DRX function to the UE.

At this time, the UE that receives the configuration information may ignore the first cycle information and perform the DRX operation according to the second cycle information.

On the other hand, if it is determined at step 910 that the cycle value to be set for the DRX operation of the UE does not exceed the predetermined value, the eNB may set the DRX cycle through typical signaling.

Therefore, at step 950, the eNB may set the first cycle information to the cycle value to be set, and transmit the configuration information including the first cycle information to the UE.

Figure 10:
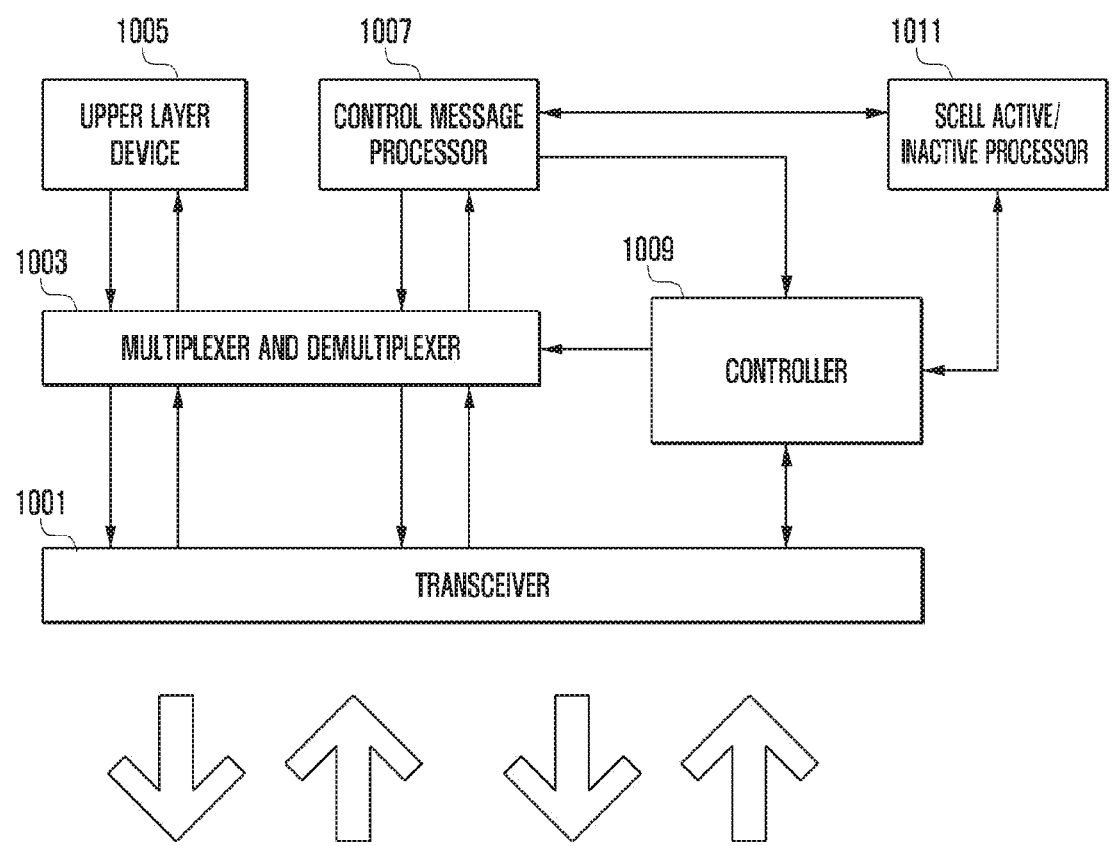
FIG. 10 is a diagram illustrating a configuration of a terminal according to the present invention.

FIG. 10 is a diagram illustrating a configuration of a terminal according to the present invention.

The terminal transmits and receives data or the like to and from an upper layer 1005, and transmits and receives control messages through a control message processor 1007. In case of transmission, the terminal performs multiplexing through a multiplexer 1003 and then transmits data through a transmitter 1001 under the control of a controller 1009. In case of reception, the terminal receives a physical signal through a receiver 1001, demultiplexes the received signal through a demultiplexer 1003, and delivers it to the upper layer 1005 or the control message processor 1007 depending on message information under the control of the controller 1009.

In the present invention, a transceiver 910 may transmit and receive signals to and from other network entity. The terminal may transmit a scheduling request (SR), a buffer status report (BSR), or data through the transceiver 910.

The controller 1009 may control to be allocated a resource for transmission of the BSR by transmitting the SR, and may transmit the BSR by using the allocated resource. Also, the controller 1009 may control to be allocated a resource for transmission of data and to transmit data by using the resource.

Further, when the SR is triggered and the resource for the SR transmission is allocated to subframes having the same time point in a plurality of serving cells, the controller 1009 may select a serving cell and transmit the SR according to the method described in FIG. 7A to 7E of the present invention.

Specifically, when a measurement gap (MG) does not conflict with the SR transmission resource of one of at least two serving cells, the controller 1009 may transmit the SR in a cell to which the SR transmission resource that does not conflict with the MG is allocated.

In addition, when the SR transmission resources of at least two serving cells do not conflict with the MG, the controller 1009 determines whether the SR transmission resources of the at least two serving cells conflict with a CSI transmission resource.

When the SR transmission resource of one of the at least two serving cells do not conflict with the CSI transmission resource, the controller 1009 may transmit the SR in a cell to which the SR transmission resource that does not conflict with the CSI transmission resource is allocated.

In addition, when the SR transmission resources of the at least two serving cells do not conflict with the CSI transmission resource, the controller 1009 determines whether the SR transmission resources of the at least two serving cells conflict with an HARQ feedback information transmission resource.

When the SR transmission resource of one of the at least two serving cells conflicts with the HARQ feedback information transmission resource, the controller 1009 may transmit the SR in a cell to which the SR transmission resource that conflicts with the HARQ feedback information transmission resource is allocated.

In addition, when the SR transmission resources of the at least two serving cells conflict or do not conflict with the HARQ feedback transmission resource, the controller 1009 determines whether the SR transmission resources of the at least two serving cells conflict with an SRS transmission resource.

When the SR transmission resource of one of the at least two serving cells does not conflict with the SRS transmission resource, the controller 1009 may transmit the SR in a cell to which the SR transmission resource that conflicts with the SRS transmission resource is allocated.

In addition, when the SR transmission resources of the at least two serving cells do not conflict with the SRS transmission resource, the controller 1009 determines whether the SR transmission resources of the at least two serving cells conflict with a PUSCH retransmission resource.

When the SR transmission resource of one of the at least two serving cells does not conflict with the PUSCH retransmission resource, the controller 1009 may transmit the SR in a cell to which the SR transmission resource that conflicts with the PUSCH retransmission resource is allocated.

In addition, when the SR transmission resources of the at least two serving cells do not conflict with the PUSCH retransmission resource, the controller 1009 may transmit the SR in a cell having the smallest signal attenuation. In the proposed method, when the SR transmission is possible in a plurality of serving cells, the SR may be selected according to an available uplink transmission resource of the UE.

Figure 11:
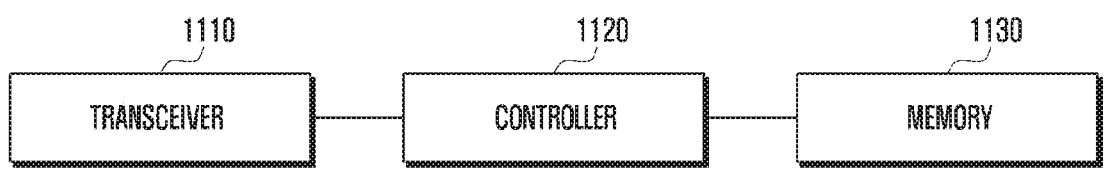
FIG. 11 is a diagram illustrating a configuration of a base station according to the present invention.

FIG. 11 is a diagram illustrating a configuration of a base station according to the present invention.

Referring to FIG. 11, the base station of the present invention may include a communication unit 1110, a controller 1120, and a storage 1130.

The communication unit 1110 may perform communication with other network entity. The communication unit 1110 may transmit configuration information to a terminal.

The controller 1120 may set a cycle for a discontinuous reception (DRX) operation of the terminal. At this time, if a cycle value to be set exceeds a first predetermined cycle value, the controller 1120 may set first cycle information to a second predetermined cycle value and set second cycle information to the cycle value to be set. This is to minimize a signaling load by setting the smallest-bit cycle value to the first cycle information because the base station cannot omit cycle information included in typical signaling for setting a DRX function to terminal. This is also to set cycle information exceeding 2560 ms by newly setting the second cycle information.

In addition, the controller 1120 may transmit configuration information including the first cycle information and the second cycle information to the terminal.

The storage 1130 may store values for configurable DRX cycle information. In addition, the storage 1130 may store other parameter values for setting the DRX function. Also, the storage 1130 may store configuration information including the DRX cycle information and parameter values.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

What is claimed:

1. A method performed by a terminal in a communication system, the method comprising:
    receiving, from a base station, information on a scheduling request (SR) resource for each of a first serving cell and a second serving cell;
    identifying whether the SR resource for the first serving cell overlaps with a measurement gap associated with the first serving cell and the SR resource for the second serving cell overlaps with a measurement gap associated with the second serving cell; and
    transmitting, to the base station, an SR on the SR resource for the first serving cell in case that the SR resource for the second serving cell overlaps with the measurement gap associated with the second serving cell and the SR resource for the first serving cell does not overlap with the measurement gap associated with the first serving cell,
    wherein the SR is not transmitted on the SR resource for the second serving cell, in case that the SR resource for the second serving cell overlaps with the measurement gap associated with the second serving cell.

2. The method of claim 1, wherein a period of the SR resource is configured for each of the first serving cell and the second serving cell.

3. The method of claim 1, wherein a hybrid automatic repeat request (HARQ) feedback and the SR are transmitted on the SR resource for the first serving cell, in case that a resource for the HARQ feedback and the SR resource for the first serving cell overlap in a time domain.

4. The method of claim 1, wherein the first serving cell and the second serving cell are associated with different frequency bands.

5. A method performed by a base station in a communication system, the method comprising:
    transmitting, to a terminal, information on a scheduling request (SR) resource for each of a first serving cell and a second serving cell; and
    receiving, from the terminal, an SR on the SR resource for the first serving cell in case that the SR resource for the second serving cell overlaps with a measurement gap associated with the second serving cell and the SR resource for the first serving cell does not overlap with the measurement gap associated with the first serving cell,
    wherein the SR is not received on the SR resource for the second serving cell, in case that the SR resource for the second serving cell overlaps with the measurement gap associated with the second serving cell.

6. The method of claim 5, wherein a period of the SR resource is configured for each of the first serving cell and the second serving cell.

7. The method of claim 5, wherein a hybrid automatic repeat request (HARQ) feedback and the SR are received on the SR resource for the first serving cell, in case that a resource for the HARQ feedback and the SR resource for the first serving cell overlap in a time domain.

8. The method of claim 5, wherein the first serving cell and the second serving cell are associated with different frequency bands.

9. A terminal in a communication system, the terminal comprising:
    a transceiver; and
    a controller configured to:
    receive, from a base station, information on a scheduling request (SR) resource for each of a first serving cell and a second serving cell,
    identify whether the SR resource for the first serving cell overlaps with a measurement gap associated with the first serving cell and the SR resource for the second serving cell overlaps with a measurement gap associated with the second serving cell, and
    transmit, to the base station, an SR on the SR resource for the first serving cell in case that the SR resource for the second serving cell overlaps with the measurement gap associated with the second serving cell and the SR resource for the first serving cell does not overlap with the measurement gap associated with the first serving cell,
    wherein the SR is not transmitted on the SR resource for the second serving cell, in case that the SR resource for the second serving cell overlaps with the measurement gap associated with the second serving cell.

10. The terminal of claim 9, wherein a period of the SR resource is configured for each of the first serving cell and the second serving cell.

11. The terminal of claim 9, wherein a hybrid automatic repeat request (HARQ) feedback and the SR are transmitted on the SR resource for the first serving cell, in case that a resource for the HARQ feedback and the SR resource for the first serving cell overlap in a time domain.

12. The terminal of claim 9, wherein the first serving cell and the second serving cell are associated with different frequency bands.

13. A base station in a communication system, the base station comprising:
    a transceiver; and
    a controller configured to:
    transmit, to a terminal, information on a scheduling request (SR) resource for each of a first serving cell and a second serving cell, and
    receive, from the terminal, an SR on the SR resource for the first serving cell in case that the SR resource for the second serving cell overlaps with a measurement gap associated with the second serving cell and the SR resource for the first serving cell does not overlap with the measurement gap associated with the first serving cell, wherein the SR is not received on the SR resource for the second serving cell, in case that the SR resource for the second serving cell overlaps with the measurement gap associated with the second serving cell.

14. The base station of claim 13, wherein a period of the SR resource is configured for each of the first serving cell and the second serving cell.

15. The base station of claim 13, wherein a hybrid automatic repeat request (HARQ) feedback and the SR are received on the SR resource for the first serving cell, in case that a resource for the HARQ feedback and the SR resource for the first serving cell overlap in a time domain.

16. The base station of claim 13, wherein the first serving cell and the second serving cell are associated with different frequency bands.

* * * * *